(12) United States Patent
Seo et al.

(10) Patent No.: US 8,414,442 B2
(45) Date of Patent: Apr. 9, 2013

(54) GEAR TRAIN OF MULTI-STEP TRANSMISSION FOR VEHICLE

(75) Inventors: Tae Seok Seo, Suwon-si (KR); Jong Sool Park, Hwaseong-si (KR); Hyuk Jun Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/316,530

(22) Filed: Dec. 11, 2011

(65) Prior Publication Data

US 2013/0040775 A1   Feb. 14, 2013

(51) Int. Cl.
  *F16H 37/02*   (2006.01)
  *F16H 3/44*    (2006.01)
(52) U.S. Cl. ............... 475/218; 475/219; 475/284
(58) Field of Classification Search .......... 475/218, 475/219, 284
  See application file for complete search history.

(56) References Cited

U.S. PATENT DOCUMENTS

| | | | |
|---|---|---|---|
| 7,479,080 B2 * | 1/2009 | Usoro | 475/5 |
| 2006/0046891 A1 * | 3/2006 | Park | 475/271 |
| 2007/0032327 A1 * | 2/2007 | Raghavan et al. | 475/5 |

FOREIGN PATENT DOCUMENTS

JP   2006-349153   12/2006

* cited by examiner

*Primary Examiner* — Edwin A Young
(74) *Attorney, Agent, or Firm* — Morgan, Lewis & Bockius LLP

(57) ABSTRACT

Disclosed herein is a gear train of a multi-step transmission for a vehicle, which can shift gears among nine forward speeds and one reverse speed. The gear train realizes a desired level of multi-step change gear ratios and has a reduced number of sets of planetary gears to reduce the volume and length of the transmission, thus realizing a compact structure, thereby facilitating the installation of the transmission in the vehicle.

19 Claims, 7 Drawing Sheets

| | CL1 | CL2 | CL3 | CL4 | CL5 | CL6 | Change gear ratio | Ratio between adjacent speeds |
|---|---|---|---|---|---|---|---|---|
| First speed | | | O | | O | | 4.622 | D1/D9=7.577 |
| Second speed | | O | | | O | | 3.000 | D1/D2=1.541 |
| Third speed | | O | O | | | | 2.291 | D2/D3=1.310 |
| Fourth speed | | O | | | | O | 1.594 | D3/D4=1.437 |
| Fifth speed | | O | | O | | | 1.212 | D4/D5=1.315 |
| Sixth speed | O | O | | | | | 1.000 | D5/D6=1.212 |
| Seventh speed | O | | | O | | | 0.835 | D6/D7=1.198 |
| Eighth speed | O | | | | | O | 0.703 | D7/D8=1.188 |
| Ninth speed | O | | O | | | | 0.610 | D8/D9=1.153 |
| Reverse speed | | | | | O | O | −4.464 | D1/R=−1.035 |

GEAR TRAIN OF MULTI-STEP TRANSMISSION FOR VEHICLE

CROSS-REFERENCE TO RELATED APPLICATION

The present application claims priority to Korean Patent Application No. 10-2011-0079639, filed on Aug. 10, 2011, the entire contents of which is incorporated herein for all purposes by this reference.

BACKGROUND OF THE INVENTION

1. Field of the Invention

The present invention relates generally to gear trains of multi-step transmissions installed in vehicles and, more particularly, to the structure of a gear train of a multi-step transmission which can shift gears among nine forward speeds and one reverse speed.

2. Description of Related Art

Generally, conventional nine or more speed transmissions for vehicles include four or more sets of planetary gears to embody a plurality of gear shift ratios.

However, use of many sets of planetary gears increases the volume or length of a transmission, thus making it difficult to install the transmission in a vehicle. Further, a set of planetary gears typically has reduced power transmission efficiency, compared to that of a simple external gear train or a simple internal gear train. In other words, the planetary gears are disadvantageous from the point of view of the power transmission efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a gear train of a multi-step transmission for a vehicle which realizes a desired level of multi-step change gear ratios and has a reduced number of sets of planetary gears to reduce the volume and length of the transmission, thus realizing a compact structure, thereby facilitating the installation of the transmission in the vehicle, and which can enhance the power transmission efficiency.

In an aspect of the present invention, the gear train of a multi-step transmission for a vehicle, may include an input shaft and an output shaft disposed parallel to each other, a first planetary gear device disposed to be concentric with the input shaft, a second planetary gear device disposed to be concentric with the output shaft, a pair of first external gears and a pair of second external gears connecting rotational elements of the first planetary gear device to rotational elements of the second planetary gear device in a manner of external gear engagement, a pair of third external gears, a pair of fourth external gears and a pair of fifth external gears connecting a remaining rotational element of the second planetary gear device, which is neither connected to the first external gears nor to the second external gears, to the input shaft in a manner of external gear engagement, a first clutch and a second clutch allowing connection and interruption between the input shaft and two corresponding rotational elements of the first planetary gear device, a third clutch and a fourth clutch each of which is connected in series to at least one of the third external gears, the fourth external gears and the fifth external gears, a fifth clutch provided to fix a rotational element of the first planetary gear device that is connected to the first clutch or one of the rotational elements of the second planetary gear device that is connected to the rotational elements of the first planetary gear device, and a sixth clutch controlling rotation of the remaining rotational element of the second planetary gear device that is neither connected to the first external gears nor to the second external gears.

The methods and apparatuses of the present invention may have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

Referring to FIGS. 1, 3 through 8, a gear train of a multi-step transmission for a vehicle according to the exemplary embodiments of the present invention includes an input shaft 1, an output shaft 3, a first planetary gear device PG1, a second planetary gear device PG2, a pair of first external gears G1, a pair of second external gears G2, a pair of third external gears G3, a pair of fourth external gears G4, a pair of fifth external gears G5, a first clutch CL1, a second clutch CL2, a third clutch CL3, a fourth clutch CL4, a fifth clutch CL5 and a sixth clutch CL6. The input shaft 1 and the output shaft 3 are disposed parallel to each other. The first planetary gear device PG1 is disposed to be concentric with the input shaft 1. The second planetary gear device PG2 is disposed to be concentric with the output shaft 3. The first external gears G1 and the second external gears G2 connect rotational elements of the first planetary gear device PG1 to rotational elements of the second planetary gear device PG2 in the manner of external gear engagement. The third external gears G3, the fourth external gears G4 and the fifth external gears G5 connect a remaining rotational element of the second planetary gear device PG2, which is neither connected to the first external gears G1 nor the second external gears G2, to the input shaft 1 in the manner of external gear engagement. The first clutch CL1 and the second clutch CL2 allow connection and interruption between the input shaft 1 and two corresponding rotational elements of the first planetary gear device PG1. Each of the third clutch CL3 and the fourth clutch CL4 is connected in series to at least one of the third external gears G3, the fourth external gears G4 and the fifth external gears G5. The fifth clutch CL5 is provided to fix the rotational element of the first planetary gear device PG1 that is connected to the first clutch CL1. The sixth clutch CL6 controls rotation of the remaining rotational element of the second planetary gear device PG2 that is neither connected to the first external gears G1 nor to the second external gears G2.

That is, the input shaft 1 and the output shaft 3 are disposed parallel to each other, and the first planetary gear device PG1 that is concentric with the input shaft 1 is connected to the second planetary gear device PG2 that is concentric with the output shaft 3 by the first external gears G1 and the second external gears G2. The input shaft 1 is connected to the one rotational element of the second planetary gear device PG2 by the third external gears G3, the fourth external gears G4 and the fifth external gears G5. In this state, a change of gear ratios including nine forward speeds and a reverse speed is embodied by connecting or interrupting the power or applying restrictions to the rotation using the first clutch CL1 through the sixth clutch CL6.

The first planetary gear device PG1 includes a double pinion planetary gear device. The second planetary gear device PG2 includes a single pinion planetary gear device. The first external gears G1 connect a first ring gear R1 of the first planetary gear device PG1 to a second ring gear R2 of the second planetary gear device PG2 in an external gear engagement way. The second external gears G2 connect a first carrier C1 of the first planetary gear device PG1 to a second carrier C2 of the second planetary gear device PG2 in an external gear engagement way.

The second ring gear R2 of the second planetary gear device PG2 is directly connected to the output shaft 3. The fourth external gears G4 and the fifth external gears G5 are disposed in series between the input shaft 1 and a second sun gear S2 of the second planetary gear device PG2. The third external gears G3 is disposed in parallel with the fourth external gears G4 and the fifth external gears G5 between the input shaft 1 and the second sun gear S2 of the second planetary gear device PG2.

Here, a single external gear 5 is provided between the fourth external gears G4 and the fifth external gears G5.

The first clutch CL1 allows connection and interruption between the input shaft 1 and the first carrier C1 of the first planetary gear device PG1. The second clutch CL2 allows connection and interruption between the input shaft 1 and the first sun gear S1 of the first planetary gear device PG1.

The construction described above is applied in common to all the exemplary embodiments of FIGS. 1, 3 through 8.

Figure 1:
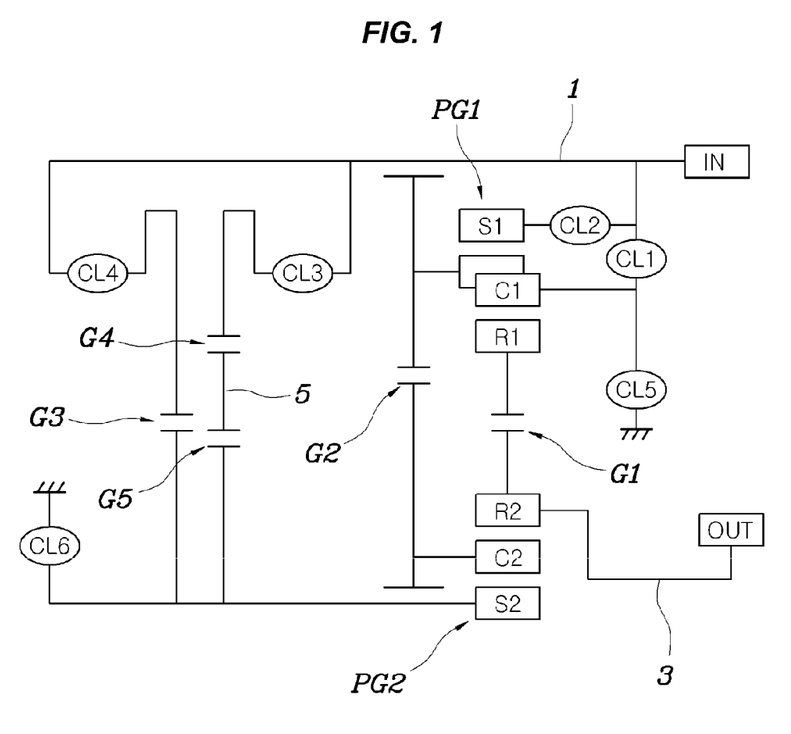
FIG. 1 is a view showing a gear train of a multi-step transmission for a vehicle, according to an exemplary embodiment of the present invention.

In the exemplary embodiment of FIG. 1, the first clutch CL3 is installed between the input shaft 1 and the fourth external gears G4. The fifth external gears G5 is disposed between the fourth external gears G4 and the second sun gear S2 of the second planetary gear device PG2. The fourth clutch CL4 is disposed between the input shaft 1 and the third external gears G3. The fifth clutch CL5 is directly connected to the first carrier C1 of the first planetary gear device PG1. The sixth clutch CL6 is directly connected to the second sun gear S2 of the second planetary gear device PG2.

Figure 3:
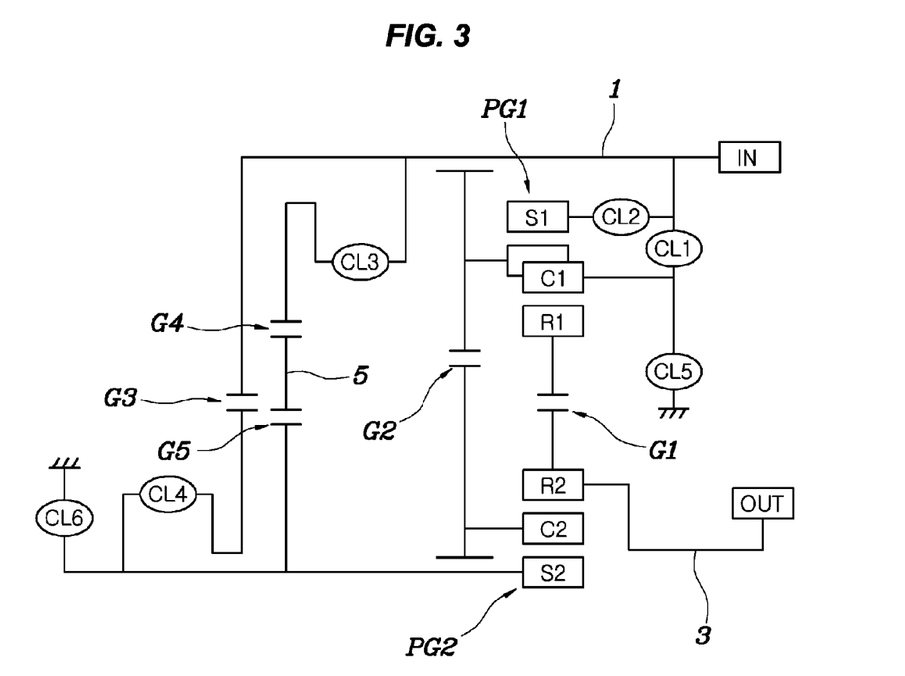
FIGS. 3 through 8 are views showing other embodiments of a gear train of a multi-step transmission for a vehicle, according to various exemplary embodiments of the present invention.

The general construction of the exemplary embodiment of FIG. 3 is the same as that of the exemplary embodiment of FIG. 1, but the fourth clutch CL4 is disposed between the second sun gear S2 of the second planetary gear device PG2 and the third external gears G3, unlike that of the exemplary embodiment of FIG. 1.

Figure 4:
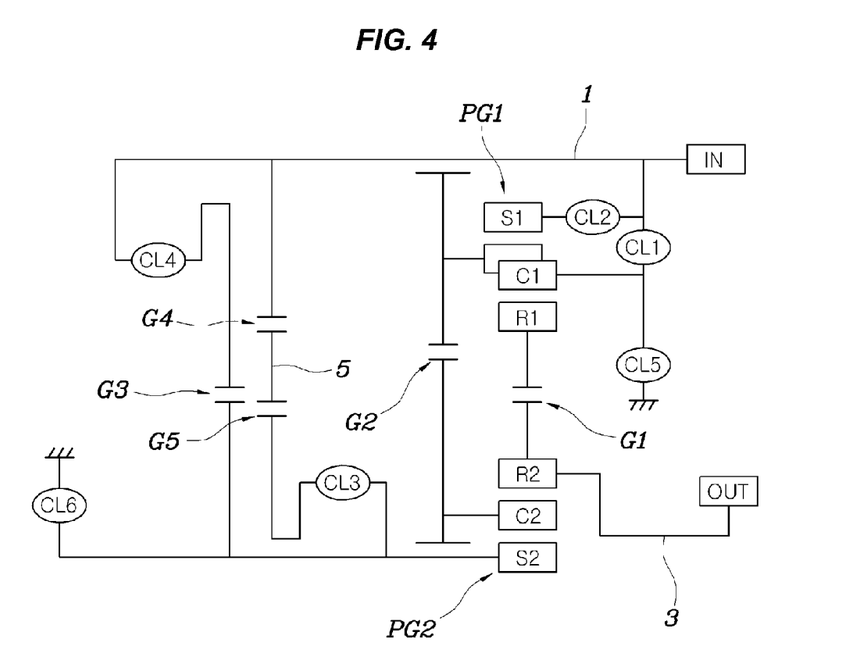

The general construction of the exemplary embodiment of FIG. 4 is the same as that of the exemplary embodiment of FIG. 1, but the third clutch CL3 is disposed between the second sun gear S2 of the second planetary gear device PG2 and the fifth external gears G5, unlike that of the exemplary embodiment of FIG. 1.

Figure 5:
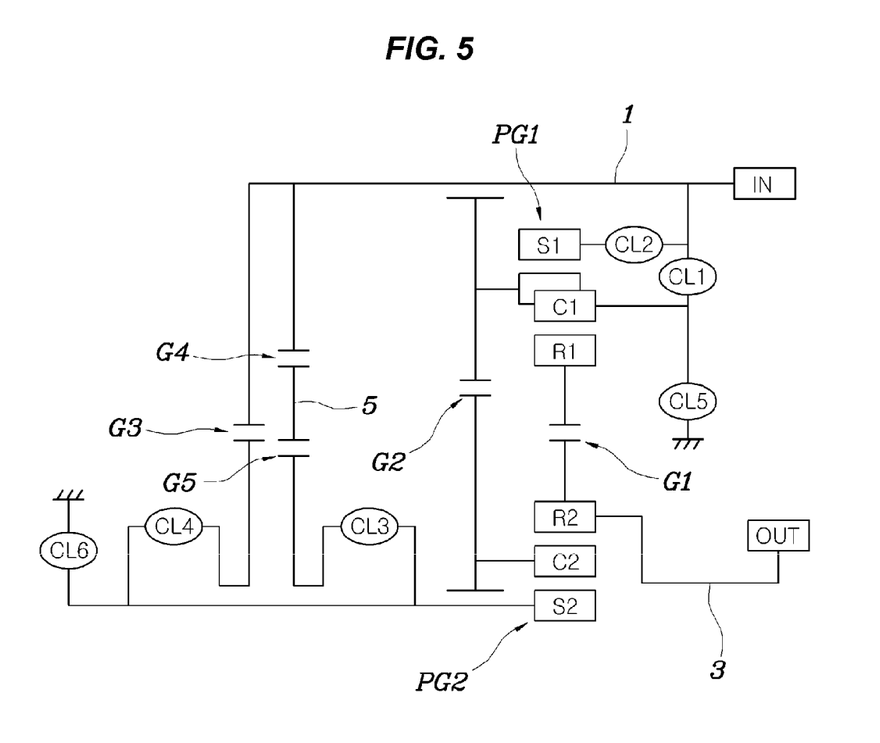

Unlike the exemplary embodiment of FIG. 1, in the exemplary embodiment of FIG. 5, the third clutch CL3 is disposed between the second sun gear S2 of the second planetary gear device PG2 and the fifth external gears G5, and the fourth clutch CL4 is disposed between the second sun gear S2 of the second planetary gear device PG2 and the third external gears G3.

Figure 6:
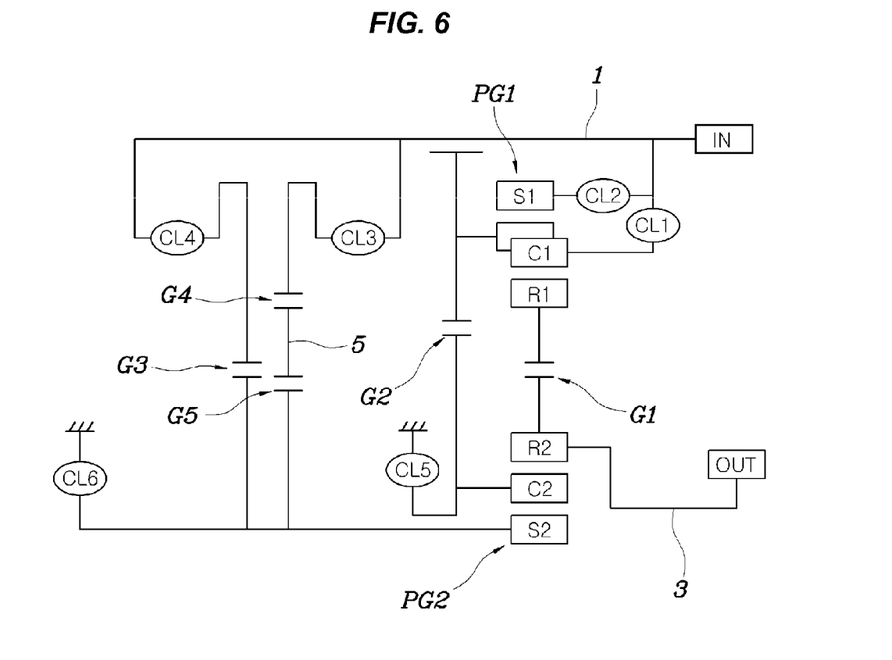

The general construction of the exemplary embodiment of FIG. 6 is the same as that of the exemplary embodiment of FIG. 1, but the fifth clutch CL5 is directly connected to either of the second external gears G2, unlike the exemplary embodiment of FIG. 1. In the exemplary embodiment of FIG. 6, the fifth clutch CL5 may be connected to a gear (e.g., second carrier C2) of the second external gears G2 that is connected to the first carrier C1 of the first planetary gear device PG1.

Figure 7:
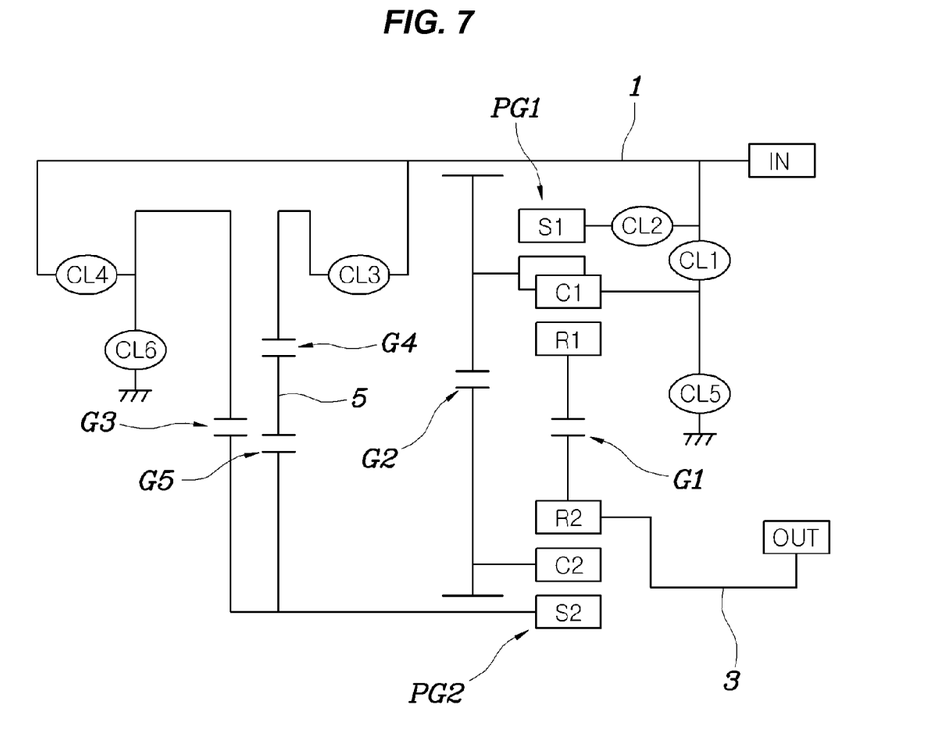

The general construction of the exemplary embodiment of FIG. 7 is the same as that of the exemplary embodiment of FIG. 1, but the sixth clutch CL6 is directly connected to a gear of the third external gears G3 that is directly connected to the fourth clutch CL4, unlike that of the exemplary embodiment of FIG. 1.

Figure 8:
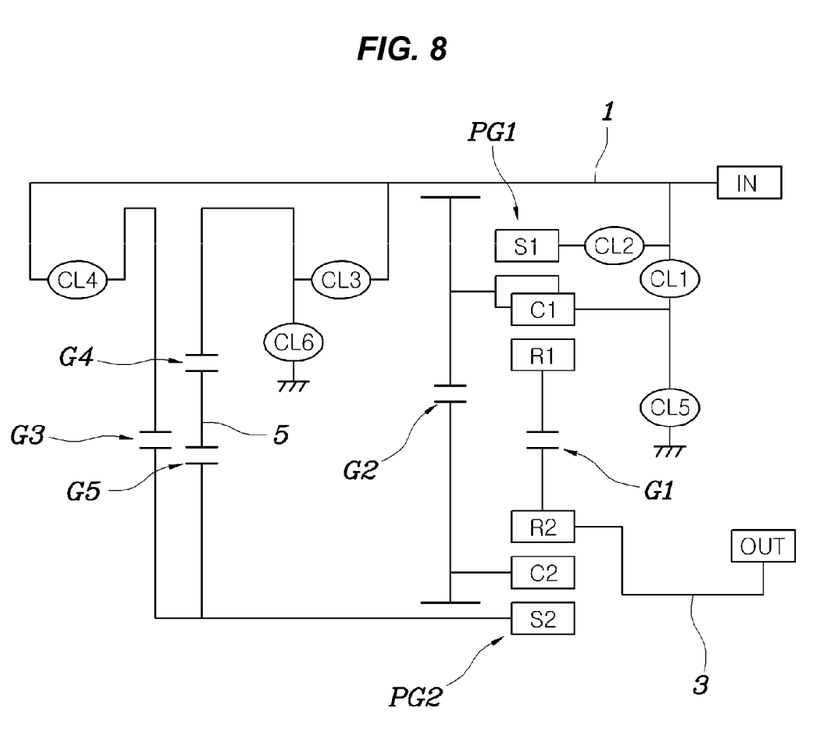

The general construction of the exemplary embodiment of FIG. 8 is the same as that of the exemplary embodiment of FIG. 1, but the sixth clutch CL6 is directly connected to a gear of the fourth external gears G4 that is directly connected to the third clutch CL3, unlike that of the exemplary embodiment of FIG. 1.

Figure 2:
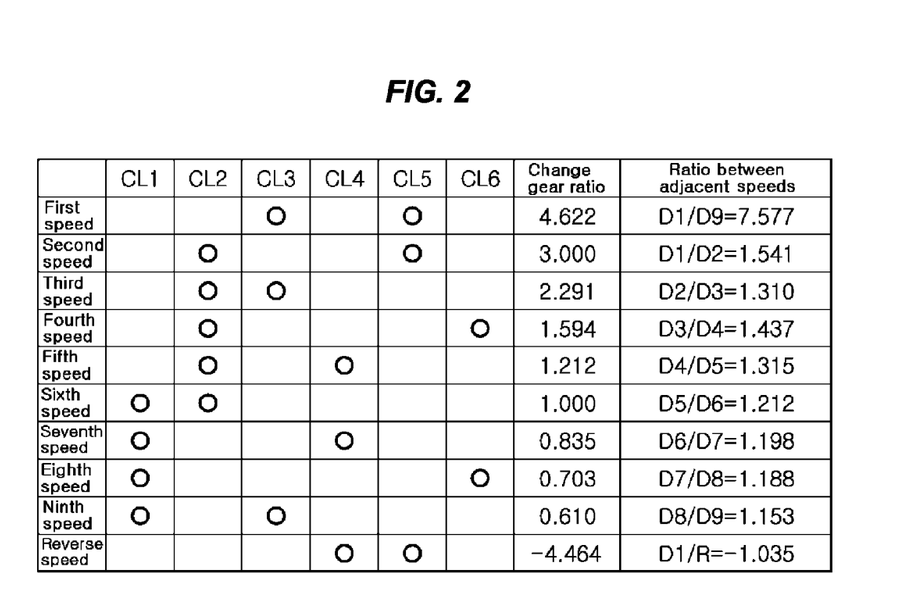
FIG. 2 is a table showing the operation of a clutch, a change gear ratio and a ratio between adjacent speeds of the gear train of FIG. 1.

As shown in the table of FIG. 2, in the gear train of the multi-step transmission according to an exemplary embodiment of the present invention having the above-mentioned construction, a change of gear ratios including nine forward speeds and one reverse speed is embodied by selectively operating the six frictional elements including the first clutch CL1 through the sixth clutch CL6.

Furthermore, in the gear train of the multi-step transmission according to an exemplary embodiment of the present invention, as can be understood in FIG. 2, every gear ratio can be embodied by the operation of two frictional elements. Moreover, consecutive gear shifting can be realized in such a way that while one frictional element is maintained, the other frictional element is changed so that gears are shifted to an adjacent gear ratio.

In addition, in the gear train of the multi-step transmission according to an exemplary embodiment of the present invention, as shown in the table of FIG. 2, the sixth speed is set to a gear ratio of 1:1, and the gear ratio of each speed is configured such that the speed of the output to the input is reduced at speeds below the sixth speed and is increased at speeds above the sixth speed. Further, a ratio of gear ratios between adjacent speeds can be evenly formed to an appropriate level, thus preventing a shifting shock from occurring due to an excessive ratio of gear ratios between adjacent speeds. Moreover, smooth and substantial gear shifting effects can be derived from an appropriate level of a ratio of gear ratios between adjacent speeds.

As described above, a gear train of a multi-step transmission for a vehicle according to an exemplary embodiment of the present invention realizes a desired level of multi-step change gear ratios and has a reduced number of sets of planetary gears to reduce the volume and length of the transmission, thus realizing a compact structure, thereby facilitating the installation of the transmission in the vehicle. Further, the gear train of the present invention can enhance the power transmission efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of a multi-step transmission for a vehicle, comprising:
    an input shaft and an output shaft disposed parallel to each other;
    a first planetary gear device disposed to be concentric with the input shaft;
    a second planetary gear device disposed to be concentric with the output shaft;
    a pair of first external gears and a pair of second external gears connecting rotational elements of the first planetary gear device to rotational elements of the second planetary gear device in a manner of external gear engagement;
    a pair of third external gears, a pair of fourth external gears and a pair of fifth external gears connecting a remaining rotational element of the second planetary gear device, which is neither connected to the first external gears nor to the second external gears, to the input shaft in a manner of external gear engagement;
    a first clutch and a second clutch allowing connection and interruption between the input shaft and two corresponding rotational elements of the first planetary gear device;
    a third clutch and a fourth clutch each of which is connected in series to at least one of the third external gears, the fourth external gears and the fifth external gears;
    a fifth clutch provided to fix a rotational element of the first planetary gear device that is connected to the first clutch or one of the rotational elements of the second planetary gear device that is connected to the rotational elements of the first planetary gear device; and
    a sixth clutch controlling rotation of the remaining rotational element of the second planetary gear device that is neither connected to the first external gears nor to the second external gears.

2. The gear train as set forth in claim 1, wherein, of the rotational elements of the second planetary gear device, a rotational element that is connected to the first external gears is directly connected to the output shaft.

3. The gear train as set forth in claim 1, wherein the fourth external gears are connected in series to the fifth external gears and are disposed in parallel with the third external gears.

4. The gear train as set forth in claim 1, wherein the first planetary gear device includes a double pinion planetary gear device,
    the second planetary gear device includes a single pinion planetary gear device,
    the first external gears connect a first ring gear of the first planetary gear device to a second ring gear of the second planetary gear device in a manner of external gear engagement, and
    the second external gears connect a first carrier of the first planetary gear device to a second carrier of the second planetary gear device in a manner of external gear engagement.

5. The gear train as set forth in claim 4, wherein the second ring gear of the second planetary gear device is directly connected to the output shaft,
    the fourth external gears and the fifth external gears are disposed in series between the input shaft and a second sun gear of the second planetary gear device, and
    the third external gears is disposed in parallel with the fourth external gears and the fifth external gears between the input shaft and the second sun gear of the second planetary gear device.

6. The gear train as set forth in claim 4, wherein the first clutch allows connection and interruption between the input shaft and the first carrier of the first planetary gear device, and
    the second clutch allows connection and interruption between the input shaft and a first sun gear of the first planetary gear device.

7. The gear train as set forth in claim 4, wherein the third clutch is disposed between the input shaft and the fourth external gears, and
    the fifth external gears are disposed between the fourth external gears and a second sun gear of the second planetary gear device.

8. The gear train as set forth in claim 4, wherein the third clutch is installed between a second sun gear of the second planetary gear device and the fifth external gears, and
    the fourth external gears are disposed between the fifth external gears and the input shaft.

9. The gear train as set forth in claim 4, wherein the fourth clutch is installed between the input shaft and the third external gears.

10. The gear train as set forth in claim 9, wherein the third external gears is directly connected to a second sun gear of the second planetary gear device.

11. The gear train as set forth in claim 4, wherein the fourth clutch is installed between a second sun gear of the second planetary gear device and the third external gears.

12. The gear train as set forth in claim 4, wherein the fifth clutch is directly connected to the first carrier of the first planetary gear device.

13. The gear train as set forth in claim 4, wherein the fifth clutch is directly connected to one of the second external gears.

14. The gear train as set forth in claim 13, wherein the fifth clutch is directly connected to a second carrier of the second planetary gear set.

15. The gear train as set forth in claim 4, wherein the sixth clutch is directly connected to a second sun gear of the second planetary gear device.

16. The gear train as set forth in claim 4, wherein the fourth clutch is disposed between the third external gears and the input shaft, and the sixth clutch is directly connected to one of the third external gears that is directly connected to the fourth clutch.

17. The gear train as set forth in claim 16, wherein the other of the third external gears is directly connected to a second sun gear of the second planetary gear device.

18. The gear train as set forth in claim 4, wherein the third clutch is disposed between the fourth external gears and the input shaft, and the sixth clutch is directly connected to one of the fourth external gears that is directly connected to the third clutch.

19. The gear train as set forth in claim 4, wherein the fourth external gears and the fifth external gears are disposed in series between the input shaft and a second sun gear of the second planetary gear device, and the fourth external gears and the fifth external gears are connected to each other by a single external gear.

* * * * *